Nov. 5, 1968    J. R. McVEY    3,409,757

CONTROLLED THERMAL ENVIRONMENT APPARATUS

Filed Jan. 13, 1966

INVENTOR.
James R. Mc Vey
BY *Ernest S Cohen*
*Gersten Sadowsky*
ATTORNEYS

United States Patent Office 3,409,757
Patented Nov. 5, 1968

3,409,757
CONTROLLED THERMAL ENVIRONMENT APPARATUS
James R. McVey, Amarillo, Tex., assignor to the United States of America as represented by the Secretary of the Interior
Filed Jan. 13, 1966, Ser. No. 521,243
7 Claims. (Cl. 219—209)

ABSTRACT OF THE DISCLOSURE

A thermocouple junction temperature controller constituted by an arrangement of heaters in a heat transfer block containing the junction in a central recess and thermistors in other recesses uniformly spaced therefrom. In response to temperature irregularities the thermistors function in control circuitry to switch on an oscillator circuit which pulses a gate control circuit determining operational intervals for an energization circuit connected to the heaters.

---

The invention relates to improvements in an apparatus for setting and controlling thermal conditions at a temperature reference site. This apparatus is particularly useful in maintaining a constant temperature for a reference junction of a thermocouple system placed in operation to measure temperatures very precisely.

In handling helium it frequently becomes important to obtain highly accurate measurements of its temperature. The copper-constantan thermocouple which is often used to make these measurements requires that its reference junction be held at a predetermined constant temperature. Ice-slush baths which have heretofore served to hold such reference junctions at a constant temperature, require close observation since they can easily become erroneous unnoticed. The apparatus of the present invention becomes operative without delay to automatically adjust the temperature at a reference junction point to a preset value within very close limits. More specifically, thermistors are applied in the invention to sense small temperature deviations at the reference junction, and are adapted to function in response thereto as a control for a switch in an electronic circuit directing the energization of heaters at the reference junction. Consequently, this apparatus does not require close checking, and once calibrated needs only to be checked periodically for accuracy.

An object of the present invention is therefore to provide an apparatus which is automatically operative to maintain a constant temperature for a temperature reference device.

A further object of the invention is to provide a thermostatically controlled heating structure for precisely regulating the temperature at a thermocouple reference junction.

Figure 1:
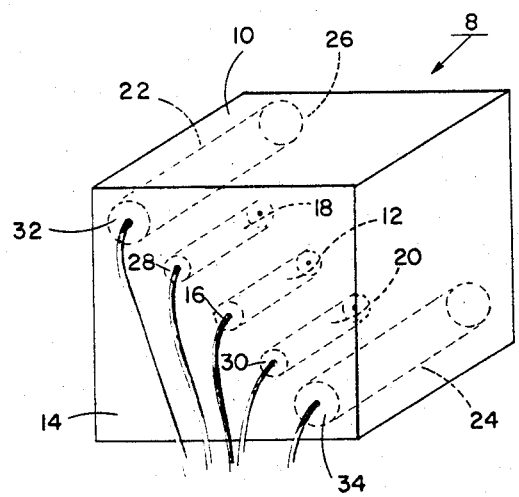
Figure 2:
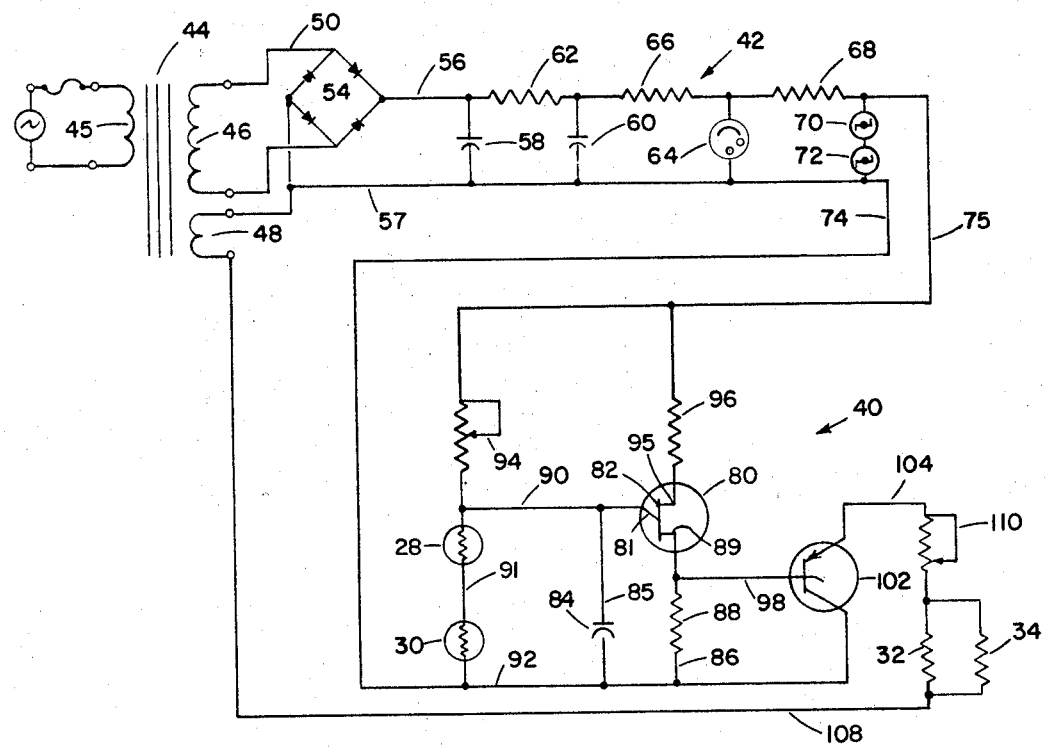

These and other objects and advantages of the invention will become more fully apparent from the following description of a preferred embodiment of the invention when considered together with the accompanying drawing in which:

FIG. 1 is a perspective view of the temperature sensing and adjusting unit of the invention showing in phantom detail the important elemental parts of the unit; and FIG. 2 is a diagrammatic representation of the invention's temperature control circuit in operative association with its power supply circuitry and the aforesaid elemental parts of the unit shown in FIG. 1.

The present invention comprises a self-adjusting temperature maintenance unit 8, which as illustrated in FIG. 1 includes a cubical block 10 having a generally cylindrical recess 12 extending from an opening in the middle of a facial surface 14 of the block to the center thereof. Contained within recess 12 is a high temperature junction 16 of a thermocouple system with which the invention is operative as a reference junction temperature control. Disposed at either side of the opening to the central recess 12, and arrayed therewith diagonally across surface 14, are two further openings of a pair of corresponding recesses 18 and 20 which extend into block 10, equally spaced from recess 12 and parallel thereto. Extending into block 10 from still further openings located adjacent opposite corners of face 14, and diagonally aligned with the recess openings thereon, are two holes 22 and 24 which pass through block 10 between face 14 and a face 26 opposite thereto on the block, parallel to and equally spaced from the thermocouple junction recess 12. Separately enclosed within recesses 18 and 20 are corresponding thermistors 28 and 30, respectively, and separately enclosed within holes 22 and 24 are corresponding resistance heaters 32 and 34, respectively. Thus assembled, temperature maintenance unit 8 is placed in a conventional Dewar jar of appropriate size wherein block 10 functions as a heat sink. In a unit 8 of an exemplary embodiment of the invention, a one-inch cube of copper is used to advantage as the heat sink constituted by block 10.

Energization of heaters 32 and 34 is controlled automatically as required to maintain within narrow limits a constant temperature for the environment in which thermocouple reference junction 16 is found. Referring to the circuit diagram of FIG. 2, heaters 32 and 34 are seen connected in parallel as part of a temperature control circuit 40. Also appearing in the figure is a power supply circuit 42 in operative association with control circuit 40. A regulated DC voltage furnished by supply circuit 42 is received in control circuit 40 to directly energize circuit switching components therein having in circuit therewith thermistors 28 and 30. As was hereinabove described, thermistors 28 and 30 are mounted in block 10 adjacent to thermocouple junction 16, whereby they are situated to sense very small increments of temperature change affecting this junction. Thus, these thermistors, which are highly responsive to changes in thermal conditions in proximity thereto, become operatively effective as necessary to develop voltages controlling the switching components of temperature control circuit 40 so as to obtain random circuit operations thereof which regulate the flow of power for energizing heaters 32 and 34.

Power for operating the circuits of FIG. 2 is derived from several secondaries of a transformer 44. In the exemplary form of the invention previously mentioned, a 115 AC voltage source feeds a primary winding 45 of transformer 44, which provides outputs of 250 v. AC on a secondary winding 46 and 12 v. AC on a further secondary winding 48. Power supply circuit 42 includes leads 50 and 51 which connect transformer winding 46 to opposite terminals of a conventional full wave diode bridge rectifier 54. A direct current output of rectifier 54 provided on its further opposite terminals, is carried on another pair of leads 56 and 57 to a filter circuit including parallel-connected capacitors 58 and 60 having a resistance 62 in series therewith. Transient frequency ripple currents in the rectifier output of bridge 54 are bled off in the capacitors of the filter circuit in a manner well known in the art. A low-power, gas-tube voltage regulator 64 is provided in the power circuit to maintain a voltage level reached by the DC voltage after it has been reduced by a voltage drop in a series connected resistance 66. A further resistance 68 serially connected in the power circuit drops the regulated voltage to 20 volts which is supplied across a series connected pair of breakdown or Zener diodes 70 and 72 to obtain further regulation of a voltage made available on leads 74 and 75 linking power supply circuit 42 to temperature control circuit 40.

Provisions made to activate temperature control circuit 40 include a relaxation oscillator arrangement comprising a unijunction transistor 80. As long as emitter 81 of the transistor is reverse-biased, the oscillator is non-conducting. A capacitor 84 is joined to emitter 81 by a lead 85, and through a further lead 90 to a potentiometer 94 which is operably connected in power supply output lead 75. When the emitter voltage is allowed to rise exponentially toward the supply voltage it reaches a peak point at which emitter 81 is forward biased and the junction resistance of transistor 80 drops to a low point. Thus, a charge accumulated on capacitor 84 is allowed to discharge through the emitter so as to derive an output at a base terminal 89 of the transistor. A rapid decrease of the emitter voltage following the discharge of capacitor 84 causes the oscillator to cease conducting until a peak voltage level is again provided at emitter 81 when capacitor 84 is charged. Resistances 88 and 96, shown connected to the base terminals 89 and 95 of transistor 80, are selected for operative association with the transistor so that they determine a suitable peak current and frequency for the oscillator, and obtain a proper frequency stability therefor.

The oscillator output is received at the base of a silicon controlled rectifier 102 which is coupled to transistor 80 by a lead 98. Rectifier 102 fires each time a pulse is received from transistor 80 whereby the rectifier functions in a circuit including leads 57, 74, 92, 104, and 108, to gate the output on secondary 48 of input transformer 44 through the circuit so as to furnish half-wave DC power to heater resistances 32 and 34, connected in parallel within lead 108 of the circuit. A trimmer potentiometer 110 serially connected with the heater resistances is provided in the circuit to facilitate precise adjustments of the current supplied to the heater resistances. Potentiometer 110 is set to give as low a temperature swing as possible, as monitored at the thermocouple output.

As hereinbefore indicated, thermistors 28 and 30 function to switch into operation the oscillator of temperature control circuit 40 so as to cause energization of heater resistances 32 and 34 as needed to maintain a constant reference temperature in block 10. Thus, while the reference temperature in block 10 remains constant, serially connected thermistors 28 and 30 constitute a relatively low resistance in circuits comprising leads 85, 90, 91, 92 and 86, such that the voltage across these thermistors is relatively low. When thermistors 28 and 30 sense any perceptible temperature drop in block 10 the thermistors respond in accordance with their negative temperature coefficient of resistance by increasing their effective resistance whereby the voltage drop across the thermistors increases correspondingly. Potentiometer 94 is operative with thermistors 28 and 30 in a voltage divider circuit across the output of power supply circuit 42 to determine the voltage applied to energize the thermistors. This potentiometer is therefore effective to set the temperature control point to the desired control temperature which should be at least 10° C. above the normal maximum room environment. At such times the preset control temperature is extant in block 10, the potential determined at emitter 81 of transistor 80 as a result of the voltage drop across thermistors 28 and 30 in circuit therewith is insufficient to support conduction through the emitter-base junction of the transistor which therefore remains ineffective. However, as previously described, a small incremental decrease of the temperature in block 10 is accompanied by an increase in the thermistors' resistance whereby the voltage to emitter 81 increases to overcome the base bias voltage of transistor 80. Transistor 80 is thereby enabled to conduct with the discharge of capacitor 84, and trigger into effect the gating circuit supplying power to heater resistances 32 and 34 through rectifier 102.

To aid in an understanding of the operation of the invention, the following types and values are assigned to the various elements shown in FIG. 2 purely for the purpose of example without any intention of limiting the invention to these types and values:

Transistors:
    80 _____ 2N1671A.
    102 _____ 2N1597.
Thermistors 28 and 30 _____ Each GA45P2, (50K).
Diodes:
    Bridge rectifier 54 _____ Each SD95.
    70 and 72 _____ Each 1Z10.
    60 _____ OB2.
    32, 34, and 88 _____ Each 47 ohms (1.5 watt).
Resistors:
    62, 66, and 68 are chosen to
      give _____ 30 ma. at OB2 and 20 ma. at 1Z10.
    94 _____ 50K ohms (4 watts).
    96 _____ 200 ohms (.5 watt).
    110 _____ 30 ohms (10 watt).
Capacitors:
    58 _____ 50/450 mf.
    60 _____ 50/450 mf.
    84 _____ .25 mf.
Transformer 44 _____ 115 v. (.5 amp)/ 250 v. (50 ma.), 12 v.

In a practical application of a circuit according to the invention, including the above identified elements, the circuit was energized one hour for a warm-up to allow block 10 to come to a set point temperature of 43.19° C. Continued operation thereafter held the temperature in block 10 controlled within a maximum excursion of 0.01° C. which would allow specifying ±0.005° C. accuracy, although the system was conservatively rated at ±0.01° C.

While a preferred embodiment of the invention has been described and illustrated, it is understood that the invention is not limited thereby but is susceptible to change in form and detail.

What is claimed is:

1. Temperature control apparatus comprising a temperature responsive heating unit including a solid element of low thermal capacity material having a plurality of specially arranged cavities therein, electrical heating and electrical temperature sensing means disposed in separate ones of said cavities, and another of said cavities being adapted to contain a device subject to controlled thermal conditions, and further comprising control circuitry for said unit including an electronic switch means operatively responsive to an electrical property of said sensing means, a power supply comprising first and second power outpput circuits, said first circuit providing an output from said power supply to said control circuitry, means operable to provide an output in said second circuit from said power supply to said heating means, and means operable in response to an operative condition of said switch means to cause operation of said means providing said power supply output to said heating means.

2. The apparatus of claim 1 wherein said cavities are symmetrically arranged on opposite sides of said another of said cavities, and said electrical temperature sensing means are thermistors contained in cavities correspondingly located on said opposite sides, and said electrical heating means are resistance heaters contained in other of said cavities correspondingly located on said opposite sides.

3. The apparatus of claim 1 wherein said electrical temperature sensing means are thermistors and said electrical heating means are resistance heaters.

4. Temperature control apparatus comprising a temperature responsive heating unit including electrical heating means and electrical temperature sensing means, and control circuitry therefor including an electronic switch means operatively responsive to an electrical property of said sensing means, a power supply comprising a transformer energized by an A.C. source and having a plurality of secondaries, a first power output circuit constituted by a voltage rectifying and regulating circuit wherein a full wave rectifier is connected to receive the output of one of said secondaries, a filter circuit receiving the output of said rectifier, and voltage regulator devices connected to said filter circuit and operably responsive to an output therefrom to supply a regulated rectified voltage from said power supply to said control circuitry, and a second power output circuit coupling the output of another one of said secondaries to a means providing an output from said power supply to said heating means, and means operable in response to the operative condition of said switch means to cause operation of said means providing said power supply output to said heating means.

5. The apparatus of claim 4 wherein said means operable to cause operation of said means providing said power supply output to said heating means comprises an oscillator circuit including a unijunction transistor having an emitter, a base and terminals therefor, and said means providing an output from said power supply comprises a gating circuit between said power supply and said heating means including a silicon controlled rectifier electrically coupled to a base terminal of said transistor and operable to effect conduction through said gating circuit upon receipt of a forward bias at said transistor emitter.

6. The apparatus of claim 4 wherein said electrical temperature sensing means comprises thermistors, said electronic switch means comprises a circuit including a capacitor, and said means operable to cause operation of said means providing an output from said power supply to said heating means comprises an oscillator circuit including a unijunction transistor having an emitter, base and terminals therefor, said capacitor being chargeable by said power supply and operable to thereafter discharge through said oscillator circuit upon an increase in the resistance of said thermistors, due to an incremental temperature drop in said heating unit, which produces a forward bias at said transistor emitter, whereby said capacitor in discharging effectuates an oscillating output at a base terminal of said transistor connected in a circuit coupling said oscillating output to said means made operative to cause operation of said means to provide said power supply output to said heating means.

7. The apparatus of claim 4 wherein said first power output circuit includes a potentiometer operable to preset said power supply of regulated, rectified voltage to said control circuitry.

References Cited

UNITED STATES PATENTS

| | | | |
|---|---|---|---|
| 2,954,479 | 9/1960 | Cibelius | 219—501 X |
| 3,042,781 | 7/1962 | Bray | 219—501 X |
| 3,042,782 | 7/1962 | Bray | 219—501 X |
| 3,069,909 | 12/1962 | Hines | 73—361 |
| 3,327,096 | 6/1967 | Bernous | 219—501 |
| 3,349,223 | 10/1967 | Barter | 219—501 X |

RICHARD M. WOOD, *Primary Examiner.*

C. L. ALBRITTON, *Assistant Examiner.*